(12) United States Patent
Nezamabadi

(10) Patent No.: US 10,379,393 B2
(45) Date of Patent: Aug. 13, 2019

(54) 3D SHAPE RECONSTRUCTION USING PROJECTION ONTO ELECTRONIC LIGHT DIFFUSING LAYERS

(71) Applicant: CANON KABUSHIKI KAISHA, Tokyo (JP)

(72) Inventor: Mahdi Nezamabadi, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 15/072,101

(22) Filed: Mar. 16, 2016

(65) Prior Publication Data

US 2017/0270669 A1    Sep. 21, 2017

(51) Int. Cl.
*G02F 1/1334* (2006.01)
*G06T 7/521* (2017.01)

(52) U.S. Cl.
CPC ............ *G02F 1/1334* (2013.01); *G06T 7/521* (2017.01)

(58) Field of Classification Search
None
See application file for complete search history.

(56) References Cited

U.S. PATENT DOCUMENTS

| 5,764,317 A | 6/1998 | Sadovnik et al. ................. 349/5 |
| 6,341,016 B1 * | 1/2002 | Malione ............. G01B 11/2509 345/419 |

| 2009/0218253 A1 | 9/2009 | Izadi et al. ..................... 345/173 |
| 2013/0163062 A1 | 6/2013 | Yang et al. .................... 359/228 |
| 2016/0076878 A1 | 3/2016 | Tin et al. ............... G01B 11/22 |

FOREIGN PATENT DOCUMENTS

DE    19641168    4/1998

OTHER PUBLICATIONS

NPL Search (Scientific and Technical Information Center, See Document 1-30).*
By: Sun, Yamin; Huang, Pingming; Su, Jufeng; Wang, Tao. EURASIP Journal on Image & Video Processing. Dec. 17, 2018, vol. 2018 Issue 1, p. 1-1. 1p.*

(Continued)

*Primary Examiner* — William C Vaughn, Jr.
*Assistant Examiner* — Daniel T Tekle
(74) *Attorney, Agent, or Firm* — Venable LLP

(57) ABSTRACT

3D shape reconstruction of objects including specular objects in which structured light patterns are projected onto multiple layers of EGlass arranged in spaced-apart relation with each other while each layer is in turn controlled to be in the diffuse mode with all others being in the transparent mode, so as to illuminate the object by the patterns projected onto the layers. Images are captured of the structured light pattern as reflected by the mirror-like surface of the specular object. By projecting multiple different patterns, such as multiple different Gray code patterns, and by sequencing through each EGlass layer for each pattern, the 3D shape of the entirety of the visible surface of the object can be reconstructed by analysis of captured images of the distorted reflections of the patterns by the surface of the object. Embodiments are also described which can be used without reconfiguration for surface reconstruction of the shape of diffuse objects.

25 Claims, 9 Drawing Sheets

(56) References Cited

OTHER PUBLICATIONS

Multiple View Geometry in Computer Vision Paperback, by Richard Hartley and Andrew Zisserman, Cambridge University Press; 2 edition Apr. 19, 2004 ISBN-13: 978-0521540513.
Multi-View Normal Field Integration for 3D Reconstruction of Mirroring Objects, Michael Weinmann et al, IEEE International Conference on Computer Vision, p. 2504-2511, ICCV 2013.
Structured-light 3D surface imaging: a tutorial, Jason Geng, IEEE Intelligent Transportation System Society, p. 128-160, ICCV 2011.
U.S. Appl. No. 14/983,365, filed Dec. 29, 2015.
U.S. Appl. No. 15/072,116, filed Mar. 16, 2016.

* cited by examiner

3D SHAPE RECONSTRUCTION USING PROJECTION ONTO ELECTRONIC LIGHT DIFFUSING LAYERS

FIELD

The present disclosure relates shape reconstruction of physical objects using structured light and multiple electronically-controllable light diffusing layers, and is particularly well-suited for shape reconstruction of objects having a mirror-like or specular surface.

BACKGROUND

For objects having a diffuse surface with lambertian reflection characteristics, there has been considerable attention given to 3D shape reconstruction using structured light. As one example, a survey of various techniques is described by Geng, "Structured-light 3D surface imaging: a tutorial," Advances in Optics and Photonics, vol. 3, pages 128-160 (2011). As used herein, "shape reconstruction" is sometimes referred to also as "depth estimation".

SUMMARY

For objects having a mirror-like or specular surface, however, such techniques cannot be used directly. For one reason, these techniques in general work by projecting an image of structured light onto the diffuse surface of the object, and measuring how the surface of the object distorts the image of the structured light. For a mirror-like or specular surface, however, an image cannot be formed on the surface, which rather simply reflects light away from the surface. For succinctness, "mirror-like or specular surfaces" will hereinafter be referred to as simply "specular surfaces".

For another reason, particularly evident when attempting to use near-field illumination in a compact measurement assembly, the specular surface introduces a depth-normal ambiguity, whereby there are multiple different and generally indistinguishable solutions to the question of the location of a surface that might have been responsible for reflecting a specific incoming ray of light.

A prior application, assigned in common with the application herein, proposes an arrangement that addresses the depth-normal ambiguity when measuring the depth value of specular objects. See "Depth Value Measurement Using Illumination by Pixels", U.S. patent application Ser. No. 14/489,008, filed Sep. 17, 2014 by Siu-Kei Tin and Mandi Nezamabadi. The arrangement described herein differs from that in application Ser. No. 14/489,008.

According to one aspect, the disclosure herein describes use of electronically-controllable light diffusing layers, which are electronically controllable between a transparent mode and a diffuse mode. Such a layer is commonly called "EGlass". As used herein, the term "EGlass" refers to an electronically switchable layer which is switchable between a transparent mode in which the layer is completely transparent, and a diffuse mode in which the layer assumes a frosted appearance. Images can be projected or formed on the frosted appearance of the diffuse mode, and this property of EGlass is used to advantage in the arrangements described herein. EGlass is sometimes referred to as "smart glass", and the diffuse mode is sometimes referred to as opaque or translucent. One common application for EGlass is in the field of selectable privacy, such as in a conference room where windows can be switched between an open transparent state and a private diffuse state.

According to an embodiment described herein, multiple layers of EGlass are controlled so that one layer is in the diffuse mode and all others are in the transparent mode. Structured light is imaged onto the layer in the diffuse mode, and the object for which shape reconstruction is sought is positioned so that it is illuminated by the pattern projected onto the layer. The specular object reflects the structured light pattern projected on the selected EGlass layer, and images are captured of the structured light pattern as reflected by the mirror-like surface of the specular object. The EGlass layers are controlled in turn so that one layer is in the diffuse mode and all others are in the transparent mode. Because the structured light pattern is projected onto multiple layers, one layer at a time, a calibration step allows disambiguation of the position-normal ambiguity, thus allowing a determination of the position of the portion of the object that is reflecting a particular aspect of the pattern. By projecting multiple different patterns, such as multiple different Gray code patterns, and by sequencing through each EGlass layer for each pattern, the 3D shape of the entirety of the visible surface of the object can be reconstructed.

Other embodiments described herein have an additional advantage whereby shape reconstruction is also possible for diffuse objects, without a change in physical configuration. In such embodiments, all of the multiple layers of the EGlass are switched to the transparent mode, such that the structured light patterns are projected through the transparent EGlass layers and imaged directly onto the surface of the diffuse object. Images of the patterns as projected onto the object are captured. Again, and without a change in configuration from that used for mirror-like specular objects, the projection of different patterns and the analysis of corresponding captured images allow 3D shape reconstruction of the entirety of the visible surface of the object.

According to further embodiments described herein, first and second transparency-controllable layers are positioned in spaced-apart relation relative to each other, wherein both of the first and second layers are controllably switchable between a transparent mode in which the layer is transparent and a diffuse mode in which the layer diffuses light. A projector is positioned and configured to project patterned light toward the first and second layers so as to illuminate the inspection station with patterned light, and an image capture device is positioned and configured to capture images of an object at the inspection station. A controller controls transparency of the first and second layers and the projection of patterned light by the projector, and estimates depth of the surface of an object positioned at the inspection station by calculations using images of the object captured by the image capture device.

The first and second layers may be positioned between the projector and the inspection station, and the projector may be positioned to project patterned light toward the inspection station. This facilitates shape reconstruction of diffuse objects using the same physical configuration as that used for specular objects. The controller controls both of the first and second layers to the transparent mode, and controls the projector to project patterned light onto the object, wherein based on diffuse components of the captured images, the controller estimates depth of the surface of an object having at least some diffuse characteristics.

Alternatively, the first and second layers may be positioned such that they are not positioned between the projector and the inspection station, and the projector may be positioned to project patterned light toward the first and second layers.

Particularly in the case of specular objects, control may proceed in two phases. In a first phase the controller controls the first layer to the diffuse mode and the second layer to the transparent mode, and controls the projector to project a first sequence of patterned light onto the first layer. In a second phase the controller controls the first layer to the transparent mode and the second layer to the diffuse mode, and controls the projector to project a second sequence of patterned light onto the second layer. Based on specular components of the captured images, the controller estimates depth of the surface of an object having at least some specular characteristics.

Each of the first and second sequences of patterned light may comprise a sequence of binary patterns of horizontal and vertical stripe patterns, each pattern in the sequence having a spatial frequency that differs from others of the patterns in the sequence. The first and second sequence of patterns may be formed using binary Gray codes. The controller may determine depth and normal at multiple points on the surface of the object by decoding patterns in the captured images of deformed patterns reflected by the surface of the object from the first and second layers.

The spaced-apart relation of the first and second layers may be determined by calibration, and the controller may determine depth and normal at multiple points on the surface of the object by tracing paths of light rays from the first layer and the second layer using the calibration.

Three or more transparency-controllable layers may be provided, wherein each of the layers in turn is controlled to the diffuse mode while all other layers are controlled to the transparent mode.

This brief summary has been provided so that the nature of this disclosure may be understood quickly. A more complete understanding can be obtained by reference to the following detailed description and to the attached drawings.

DETAILED DESCRIPTION

Figure 1:
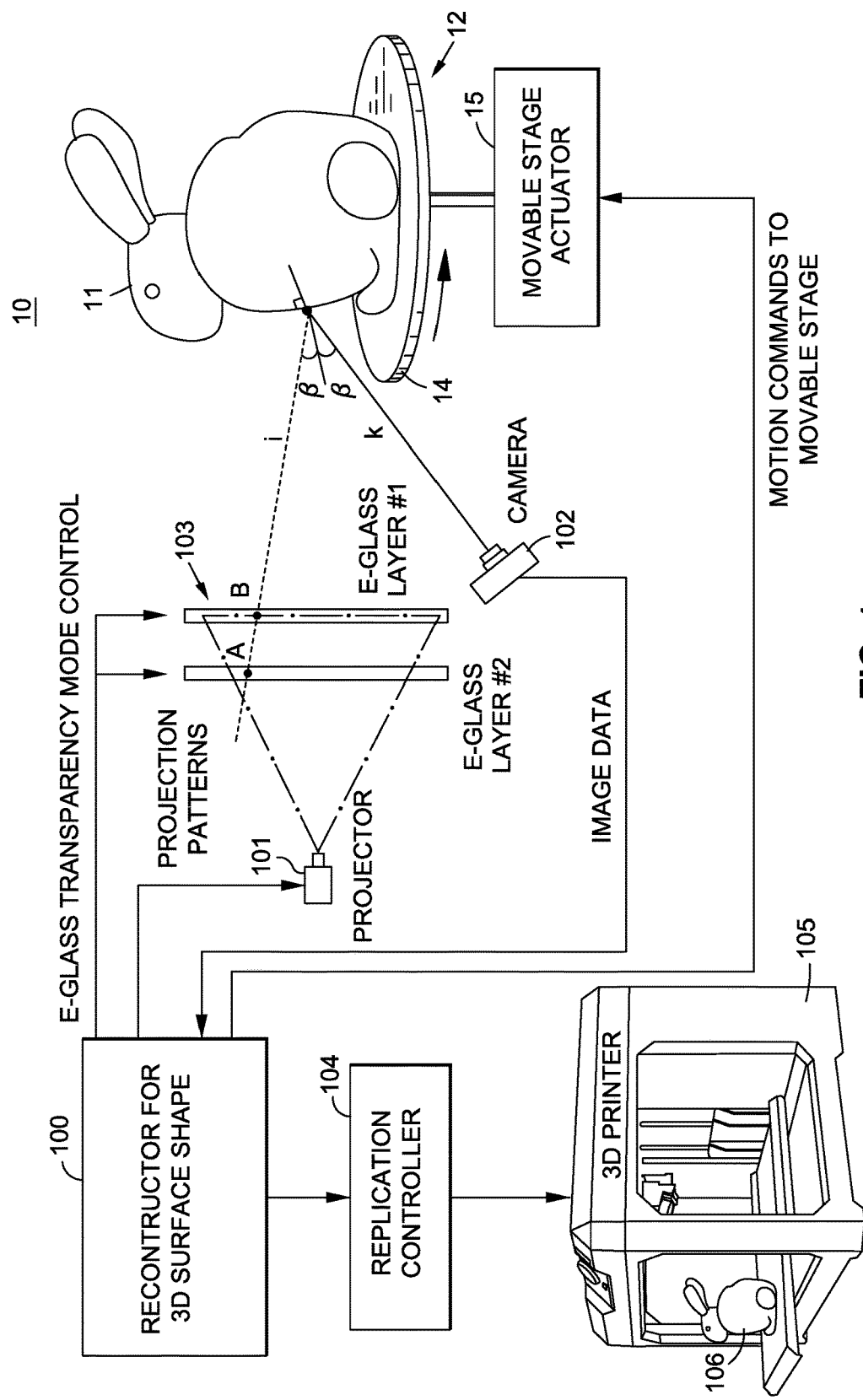
FIG. 1 is a view showing one example embodiment of a system for recovery of 3D surface shape.

FIG. 1 is a view showing one example embodiment of a system for recovery of surface shape of glossy objects such as mirror-like and specular objects, or objects having a specular component of reflection, in the form of a replication system 10 in which surface shape of objects is recovered for replication, for example, for 3D replication of the object physically (such as with a 3D printer) or representationally (as with a graphics display).

While FIG. 1 depicts a replication environment, it should be understood that this is simply an example environment in which the disclosure herein may be practiced, and that other environments or embodiments are of course possible. For example, recovery of surface shape can also be used in the context of automated inspection, robotics, machine vision, quality control, image retrieval, shape modelling and scene reconstruction, security and so forth, among many others.

As shown in FIG. 1, an object 11 is positioned at an inspection station 12, which in this embodiment is the surface of a movable stage 14 by which the object can be moved into varying perspectives. In this embodiment, the movable stage is movable by rotation about a vertical axis, and in other embodiments the movable stage may be a 3-axis positioning table. Object 11 is typically a specular object or a mirror-like object, or other similar object with a glossy or highly glossy surface. Movable stage 14 is moved under control of actuator 15, via motion commands issued by reconstructor 100 for reconstruction of surface shape.

Reconstructor 100 is configured to reconstruct surface shape of objects at inspection station 12, based on commands issued to projector 101 and commands issued to actuator 15 for movable stage 14, and based on spectral image data received from image capture system 102. Based on the reconstruction obtained by reconstructor 100, reconstructor 100 controls replication controller 104 so as to obtain a 3D replication of the object. In this embodiment, 3D replication of the object is obtained physically via 3D printer 105, to produce replicated object 106. In other embodiments, 3D replication of the object may be obtained representationally via a graphics display. More details of reconstructor 100 are provided below, such as in connection with FIG. 3.

FIG. 1 further depicts plural transparency-controllable layers 103, positioned in spaced-apart relation relative to each other. In the FIG. 1 embodiment, there are two spaced-apart layers and in other embodiments there may be three or more spaced-apart layers. Under control from reconstructor 100, each transparency controllable layer is independently switchable between a transparent mode in which the layer is transparent, and a diffuse mode in which the layer diffuses light.

For the plural transparency-controllable layers 103, this embodiment uses multiple layers of EGlass. As used herein, the term "EGlass" refers to electronically switchable glass which is switchable between a transparent mode in which the glass is completely transparent, and a diffuse mode in which the glass assumes a frosted appearance. Images can be projected or formed on the frosted appearance of the diffuse mode, and this property of EGlass is used to advantage in the configuration described herein. EGlass is sometimes referred to as "smart glass", and the diffuse mode is sometimes referred to as opaque or translucent. One common use of EGlass is in the field of selectable privacy, such as in a conference room where the windows can be switched between an open transparent state and a private diffuse state.

EGlass is typically formed of a polymer dispersed liquid crystal (PDLC) or polymer stabilized cholesteric texture (PSCT) film sandwiched between two layers of glass with two layers of conductive interlayers, so as to allow control of the EGlass between the transparent mode and the diffuse mode. Other technologies for fabricating EGlass include suspended particle devices (SPDs) and electrochromic devices. For the EGlass used in this embodiment, the change-over from transparent mode to diffuse mode, and vice-versa, takes less than 10 seconds.

As used herein, EGlass refers to any of these or similar technologies, in which the transparency of a layer is controllable electrically between a fully transparent mode and a fully diffuse mode.

The EGlass layers are positioned in spaced-apart relation to each other, such that by using the relative postionings of the EGlass layers to projector 101 and camera 102, ray-tracing and/or triangulation techniques allow reconstruction of the 3D surface shape of the object 11 under inspection. The relative postionings are predetermined through calibration. More details on the relative positionings of EGlass layers 103, relative to other elements such as projector 101 and image capture system 102, and calibration thereof, are provided below such as in connection with FIGS. 4A and 4B.

One additional benefit of the example embodiment shown in FIG. 1 is that the same physical configuration can be used both for mirror-like objects having specular reflection characteristics as well as for diffuse objects having diffuse reflection characteristics. Or, the same physical configuration can be used for 3D shape reconstruction of a non-homogeneous object for which some portions exhibit mirror-like specular reflections and other portions exhibit diffuse reflections. More specifically, for diffuse or partially diffuse objects, 3D shape reconstruction can be obtained by controlling the transparency modes of EGlass layers 103 in ways that differ from control when mirror-like objects are being inspected.

Relatedly, projector 101 in this embodiment has an autofocus function, by which patterns projected by the projector are automatically focused onto the surface where the patterns are projected. This provides an advantageous benefit: because the transparency mode of the EGlass layers 103 is changed between diffuse mode and transparent mode, the surface onto which patterns are projected is likewise changed. For example, in a circumstance when an innermost EGlass layer is in the diffuse mode, patterns are projected onto the innermost layer. The focus distance in this circumstance differs from a circumstance when the innermost EGlass layer is in the transparent mode and the outermost layer is in the diffuse mode, where patterns are projected onto the outermost layer. Both of these focus distances are different from the circumstance when all EGlass layers are in the transparent mode, the object is diffuse, and patterns are projected directly onto the surface of the diffuse object. The autofocus function of projector 101 responds automatically to these changes in focus distance, ensuring that the projected patterns remain in focus regardless of the surface onto which they are projected.

Figure 2A:
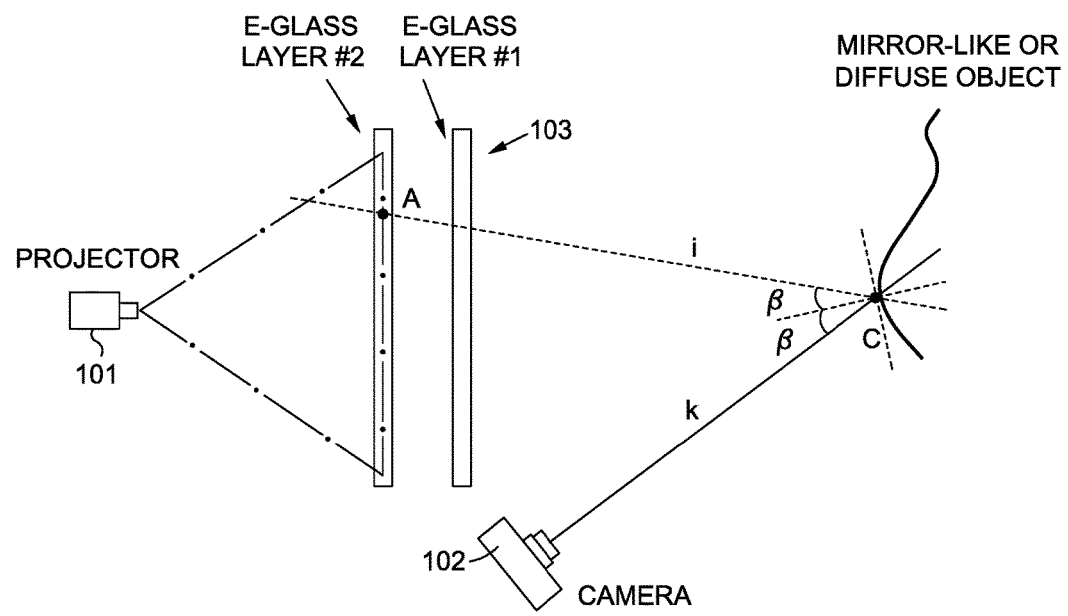
FIGS. 2A, 2B, 2C and 2D are views for explaining principles by which the 3D shape of objects can be recovered.
Figure 2B:
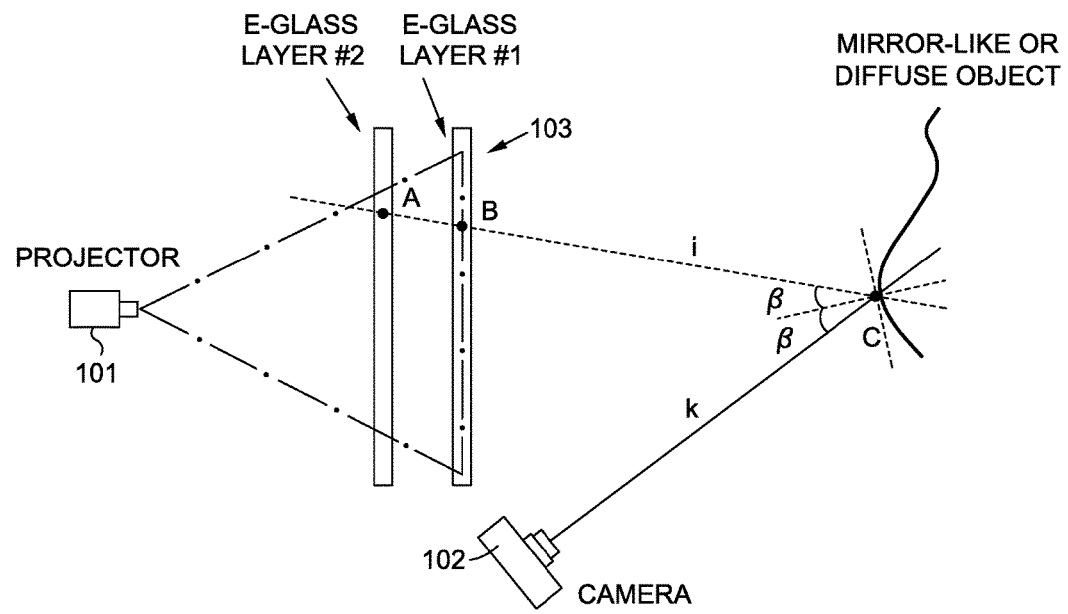

FIGS. 2A and 2B are views for explaining one principle by which the 3D shape of mirror-like objects can be recovered, through control over the transparency modes of EGlass layers 103. In these figures, projector 101, camera 102, and two layers 103 of EGlass are used to estimate surface normal vectors of a mirror-like object 11. The EGlass layers are controllable to either of transparent mode or diffuse mode by applying an electric signal from reconstructor 100. At each time, one of the layers is set to diffuse mode and all other layers are set to transparent mode, and a pattern sequence is projected onto the back of the layer in diffuse mode via projector 101. The mirror-like surface of object 11 reflects the patterns, and the reflections are distorted by the 3D shape of the surface of the object. These distorted reflections from object 11 are captured by camera 102 and used for estimation of the surface normal vectors and/or for estimation of 3D surface shape. It will be understood that surface normal and 3D surface shape are virtually interchangeable, inasmuch as 3D surface shape is the integral of surface normal, and surface normal is the derivative of 3D surface shape.

The position of camera and the EGlass layers are determined during the calibration process, described below, and stored for later computations. The correspondences between camera pixels and points on EGlass layers are established by projecting conventional coded patterns, different from each other, such that each pixel at the layer is uniquely identifiable. The patterns may, for example, be binary patterns of horizontal and vertical stripe patterns, each pattern in the sequence having a spatial frequency that differs from others of the patterns in the sequence, such as Gray code patterns.

As presented in FIGS. 2A and 2B, the ray i, connecting points A and B, is reflected off the object at point C. This ray reaches the camera through the path marked by ray k. Incident and reflection angles can be determined, as well as surface normal at point C, by finding the intersection of the rays i and k.

In FIG. 2A, the innermost layer (layer #2) of EGlass layers 103 is controlled to the diffuse mode while all other layers are controlled to transparent mode. A pixel projected on EGlass #2 at point A creates a ray, i, which is reflected off the object at an angle of β at point C.

In FIG. 2B, the outermost layer (layer #1) of EGlass layers 103 is controlled to the diffuse mode while all other layers are controlled to transparent mode. A pixel projected on EGlass #1 at point B also results in the same ray, i, which is reflected off the object at the same point C and angle of β. The intersection of camera ray k and i is determined to estimate 3D position of C as well as the surface normal at that point.

In this way the reflection angle of β and consequently the corresponding surface normal of the object at the inspection station can be calculated based on traditional triangulation methodology.

If the object 11 at the inspection station is diffuse, then all EGlass layers are set to transparent mode, and projector 101 projects the patterns directly onto the surface of the diffuse object. Camera 102 captures images of the patterns, through all EGlass layers, and the captured images used for estimation of 3D surface shape. In this way the depth for each pixel of the object at the inspection station can be calculated based on traditional triangulation methodology, even for diffuse objects, and without a change in physical configuration of replication system 10.

Figure 3:
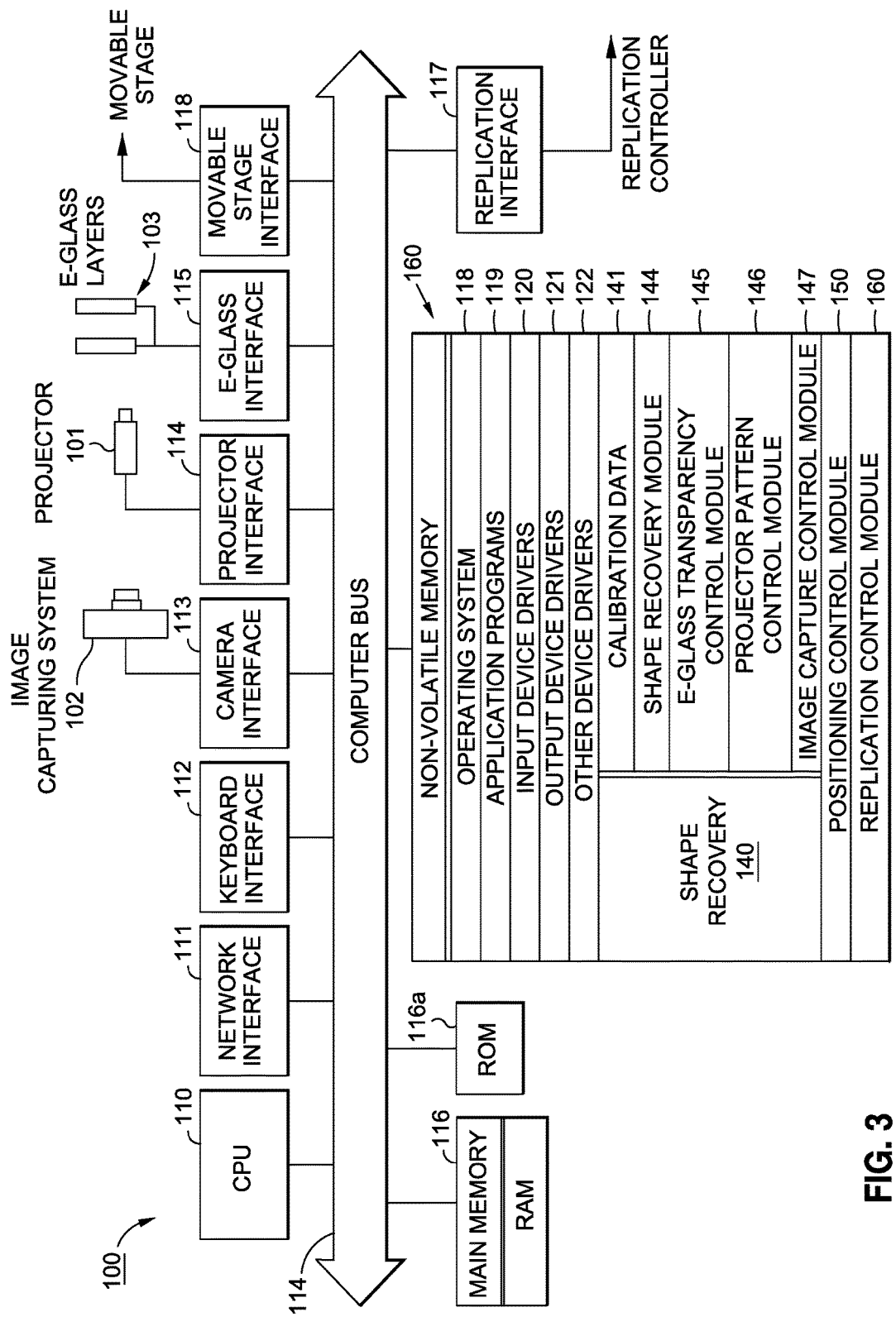
FIG. 3 is a view for explaining an architecture for reconstruction of 3D surface shape of an object.

FIG. 3 is a view for explaining one embodiment of the architecture of reconstructor 100 for reconstruction of surface shape of objects at inspection station 12.

As shown in FIG. 3, reconstructor 100 includes central processing unit (CPU) 110 which interfaces with computer bus 114. Also interfacing with computer bus 114 are network interface 111, keyboard interface 112, camera interface 113 which interfaces to image capture system 102, projector interface 114 which interfaces to projector 101, EGlass interface 115 which interfaces to the plural EGlass layers 103, movable stage interface 118 which interfaces to actuator 15 of movable stage 14, random access memory (RAM) 116 for use as a main run-time transient memory, read only memory (ROM) 116a, replication interface 117 for interface to replication controller 104, and non-volatile memory 160 (e.g., a hard disk or other nonvolatile and non-transitory storage medium).

RAM 116 interfaces with computer bus 114 so as to provide information stored in RAM 116 to CPU 110 during execution of the instructions in software programs, such as an operating system, application programs, image processing modules, and device drivers. More specifically, CPU 110 first loads computer-executable process steps from non-volatile memory 160 or another storage device into a region of RAM 116. CPU 110 can then execute the stored process steps from RAM 116 in order to execute the loaded computer-executable process steps. Data also can be stored in RAM 116 so that the data can be accessed by CPU 110 during the execution of the computer-executable software programs, to the extent that such software programs have a need to access and/or modify the data.

As also shown in FIG. 3, non-volatile memory 160 contains computer-executable process steps for operating system 118, and application programs 119, such as graphic image management programs. Non-volatile memory 160 also contains computer-executable process steps for device drivers for software interface to devices, such as input device drivers 120, output device drivers 121, and other device drivers 122.

Non-volatile memory 160 also stores a shape recovery module 140, a positioning control module 150, and replication control module 160. These modules, i.e., the shape recovery module 140, the positioning control module 150, and the replication control module 160, are comprised of computer-executable process steps for recovery or reconstruction of 3D surface shape of an object, for repositioning of the object on movable stage 14, and for control of replication controller 104 for 3D replication of the object.

As shown in FIG. 3, shape recovery module 140 generally comprises calibration data 141 for determining angle of ray of light based on triangulation as the ray passes through the plural EGlass layers 103, and shape recovery module 144 for recovery of surface shape of the object under inspection. Shape recovery module 140 also generally comprises an EGlass transparency control module 145 for control over the transparency modes of each of the plural EGlass layers 103, a projector pattern control module 146 which stores plural sequences of patterned light patterns and which controls projection of the plural sequences of patterned light patterns by projector 101, as well as image capture control module 147 for control of image capture by image capturing system 102.

Positioning control module 150 controls repositioning of the object on movable stage 14, and replication control module 160 controls replication controller 104 for 3D replication of the object.

The computer-executable process steps for these modules may be configured as part of operating system 118, as part of an output device driver in output device drivers 121, or as a stand-alone application program(s). These modules may also be configured as a plug-in or dynamic link library (DLL) to the operating system, device driver or application program. It can be appreciated that the present disclosure is not limited to these embodiments and that the disclosed modules may be used in other environments.

Figure 4A:
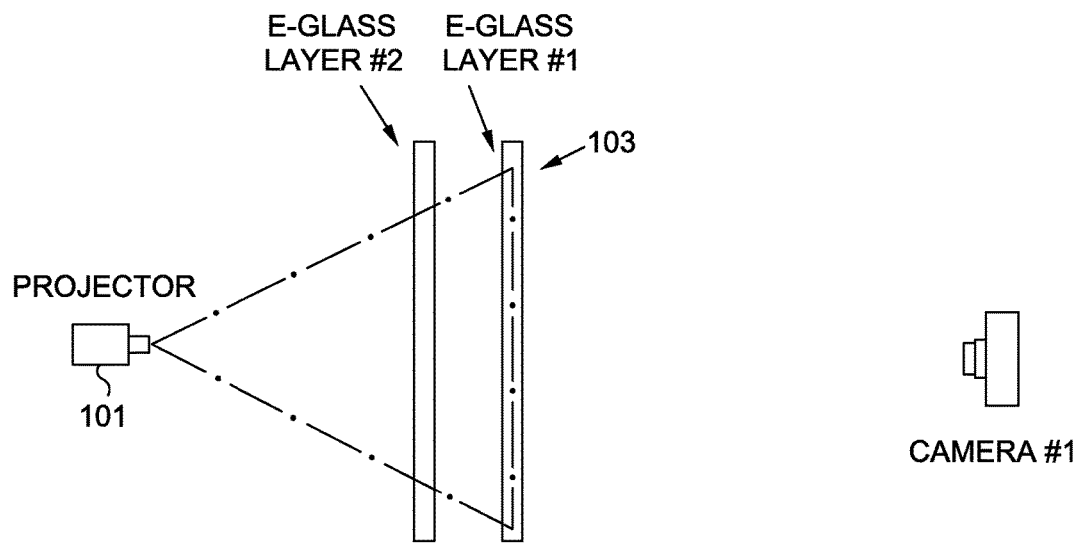
FIGS. 4A and 4B are views for explaining one example of calibration.
Figure 4B:
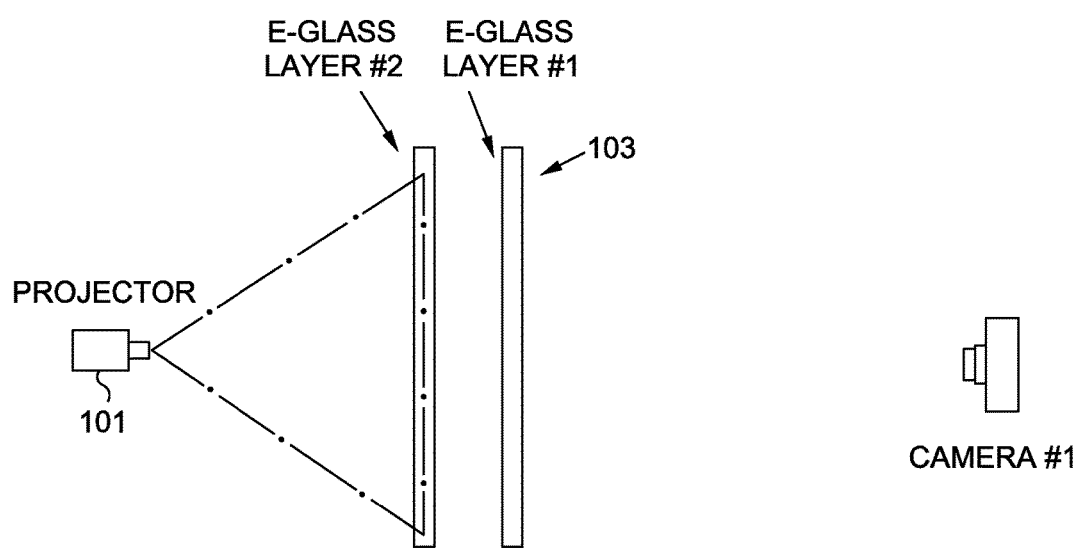

FIGS. 4A and 4B are views for explaining one example of calibration whereby the positional relationships among EGlass layers 103, projector 101 and camera 102 are determined.

The extrinsic and intrinsic parameters of utilized cameras can be determined using conventional geometrical calibration methods. Various techniques are described in the literature, such as "Multiple View Geometry in Computer Vision Paperback", by Richard Hartley and Andrew Zisserman, Cambridge University Press; 2nd edition, Apr. 19, 2004, ISBN-13:978-0521540513. The correspondences between camera pixels and points on EGlass layers are established by projecting conventional coded patterns such as Gray code patterns on one of the EGlass layers while the other EGlass layers are set to a transparent mode. Using a camera positioned in front of the EGlass layers, a determination can be made of the position of each projected pixel. FIG. 4A illustrates such a determination for outermost layer #1 of EGlass layers 103, and FIG. 4B illustrates such a determination for innermost layer #2 of EGlass layers 103.

Figure 5A:
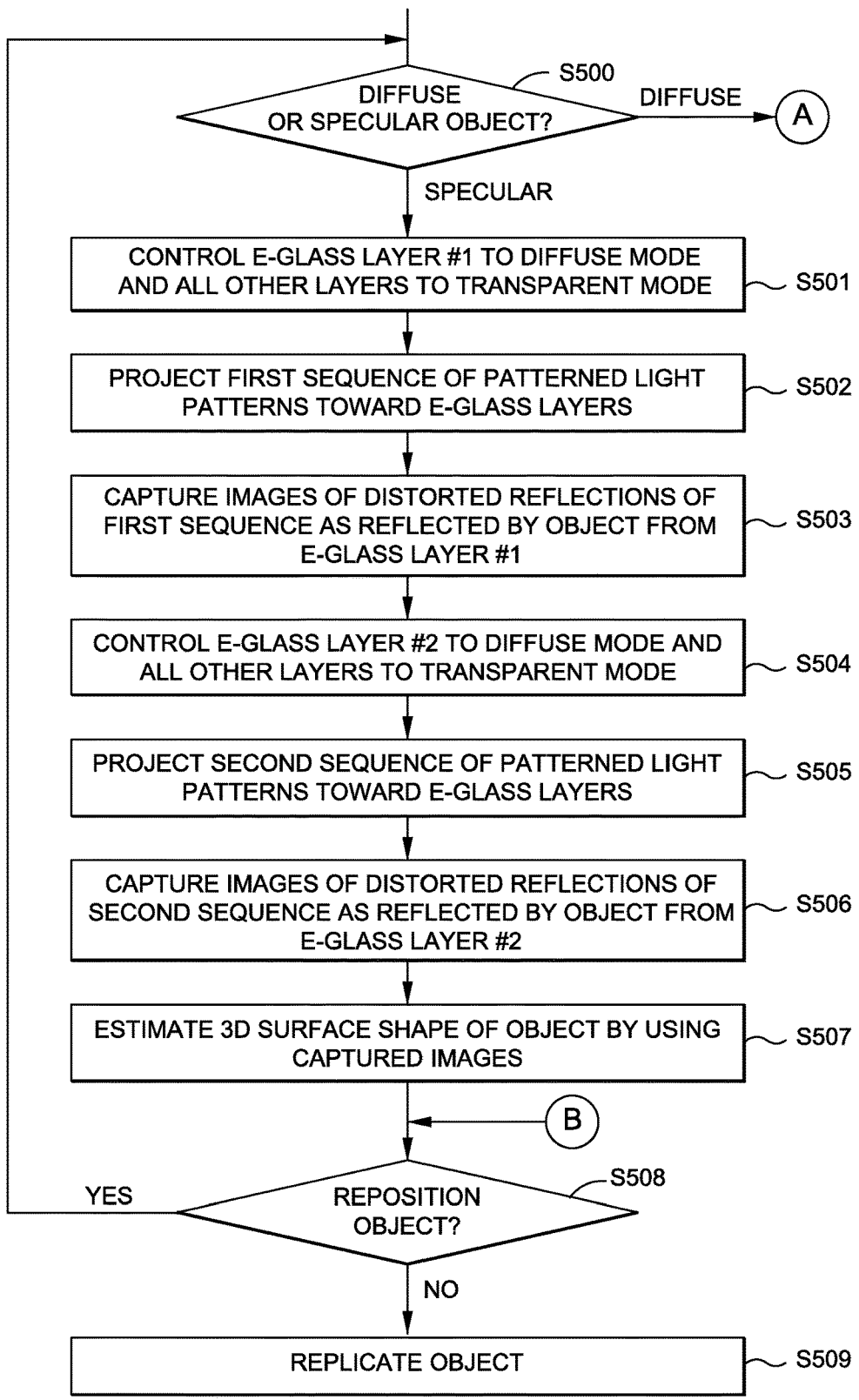
FIGS. 5A and 5B depict a flow diagram showing steps for 3D shape estimation and 3D reconstruction of an object.
Figure 5B:
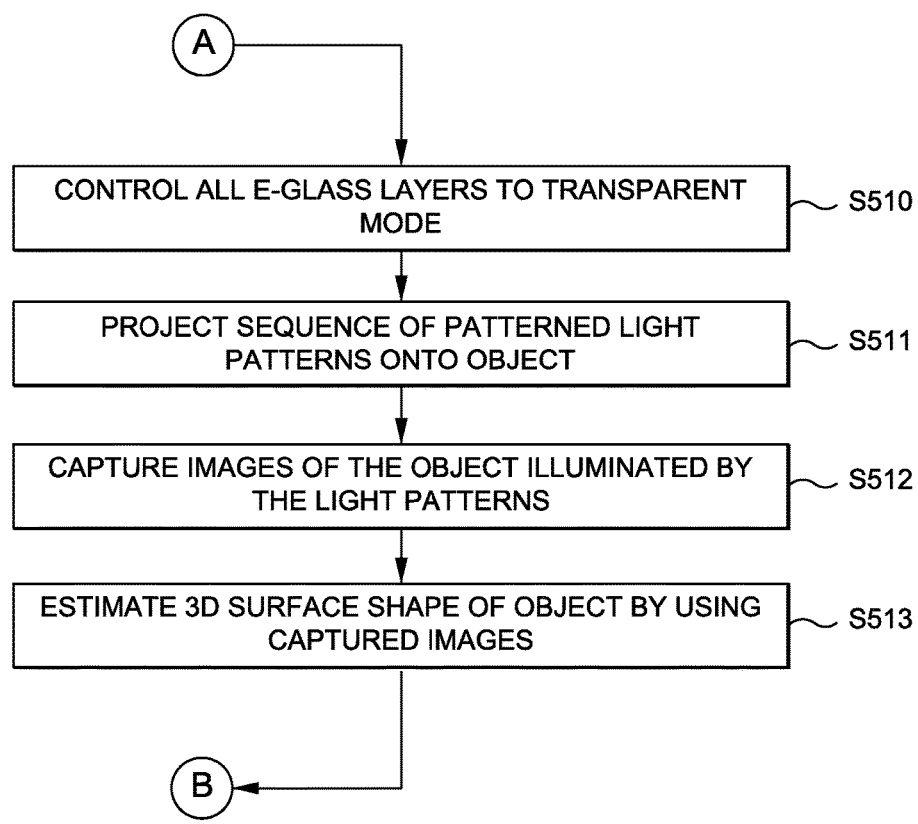

FIG. 5 is a flow diagram depicting steps for shape reconstruction according to one embodiment. In this embodiment, shape reconstruction may be performed either for mirror-like specular objects or for diffuse objects, without a change in physical configuration.

The steps of FIG. 5 are preferably executed post-calibration of the positional relationships among the EGlass layers 103, projector 101 and camera 102.

In step S500, a determination is made as to whether the object is diffuse or specular. Alternatively, the object might be a non-homogeneous object, containing diffuse areas as well as specular areas. The determination made be made manually or automatically, such as based on the nature and quantity of light reflected from the object during a trial projection from projector 101.

In the event that the object is determined to be specular, flow advances to steps S501 through S507. Generally speaking, according to these steps, first and second layers of plural transparency-controllable layers are controlled between a transparent mode in which the layer is transparent and a diffuse mode in which the layer diffuses light. A first sequence of light patterns is projected onto the first layer while the first layer is controlled to the diffuse mode and the second layer is controlled to the transparent mode, and a second sequence of light patterns is projected onto the second layer while the first layer is controlled to the transparent mode and the second layer is controlled to the diffuse mode. Images are captured of deformed patterns reflected from the first and second layers by the surface of the object, in correspondence to illumination of the object by the layers onto which the first and second sequence of light patterns are projected. 3D shape of the surface of the object is estimated by calculations using the captured images.

More specifically, in step S501, EGlass layer #1 is controlled to the diffuse mode and all other layers are controlled to the transparent mode. At step S502, a first sequence of patterned light patterns is projected toward the EGlass layers. Because EGlass layer #1 is controlled to the diffuse mode, projector 101 projects an image of the patterns focused onto EGlass layer #1. Because all other EGlass layers including layer #2 are controlled to the transparent mode, the patterns focused on EGlass layer #1 are visible to the mirror-like object through layers such as layer #2 which are closer to the object. The mirror-like object thus reflects these patterns as distorted by the surface shape of the object.

In step S503, the object reflects distorted reflections of the first sequence, and images of the distorted reflections are captured by camera 102.

Likewise, in steps S504 through S506, EGlass layer #2 is controlled to diffuse mode and all other layers to transparent mode, and a second sequence of patterned light patterns are projected toward the EGlass layers. Because EGlass layer #2 is controlled to the diffuse mode, projector 101 projects an image of the patterns focused onto EGlass layer #2. Because all other layers including layer #1 are controlled to the transparent mode, the patterns can be projected through layers such as layer #1 which are positioned more closely to the projector, and the patterns focused on EGlass layer #2 are visible to the mirror-like object through those other layers. The mirror-like object thus reflects these patterns as distorted by the surface shape of the object, and images are captured of the distorted reflections of the second sequence as reflected by the object from EGlass layer #2.

In step S507, reconstructor 100 estimates 3D surface shape of that portion of the object which is visible to the camera, and illuminated by the patterns projected onto the layers, by using the captured images.

In that regard, for a camera and a given pixel we can define rays i and k parametrically as the following:

$$\vec{i} = \vec{A} + t.\vec{u} \text{ and } \vec{u} = \frac{(\vec{A} - \vec{B})}{\|\vec{A} - \vec{B}\|} \quad (1)$$

$$\vec{k} = \vec{H} + s.\vec{v} \text{ and } \vec{v} = \frac{(\vec{H} - \vec{P})}{\|\vec{H} - \vec{P}\|} \quad (2)$$

Figure 2C:
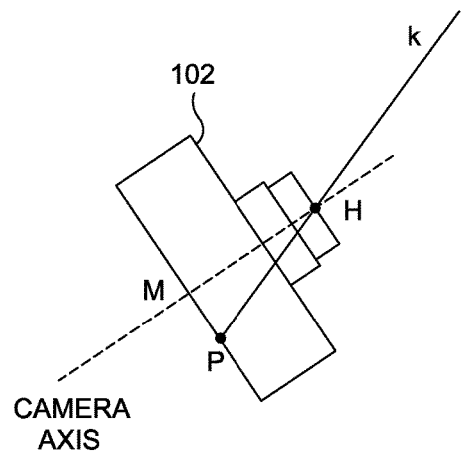

In the above, t and s are free parameters and $\vec{A}$ and $\vec{B}$ are vectors corresponding to point A and B on E-Glass layers as shown in FIG. 2A. The $\vec{H}$ and $\vec{P}$ are vectors corresponding to camera 102 center H and pixels P as shown in FIG. 2C. Referring to FIG. 2B one can calculate intersection of the rays i and k or its approximate (the closet point to both rays) as $$C = +\tfrac{1}{2}(A + t_0 u + H + s_0 v) \quad (3)$$

In the above equation (3), the following apply:

$$w = A - H \quad (4)$$

$$t_0 = \frac{u \cdot w - (u \cdot v)(v \cdot w)}{1 - (u \cdot v)^2} \quad (5)$$

$$s_0 = \frac{-v \cdot w + (u \cdot v)(u \cdot w)}{1 - (u \cdot v)^2} \quad (6)$$

One can easily compute angle, θ, between two rays i and k as $$\theta = \cos^{-1}\left(\frac{\vec{i}.\vec{k}}{\|\vec{i}\|.\|\vec{k}\|}\right) \text{ and } \beta = \frac{\theta}{2} \quad (7)$$

In step S508, via positioning module 150, reconstructor 100 issues a positioning command to reposition movable stage 14 and the object thereon. Repositioning of the object exposes other areas of its surface to image capture and illumination by the layers, and thereby permits 3D shape reconstruction with as much of the entirety of the object as desired. Flow then returns to step S500, for a repeated determination of whether the visible portion of the object is diffuse or specular. In other embodiments, step S500 may be skipped, with flow returning directly to step S501.

When no further repositionings are performed, flow advances to step S509 wherein via replication control module 160, reconstructor 100 executes 3D replication of the object. Replication may be a physical replication such as by using 3D printer 105, or replication may be a graphical replication of the object, from arbitrary perspectives and from arbitrary illumination directions and sources.

Reverting to step S500, if the object is determined to be diffuse, then flow branches to step S510. In step S510, all EGlass layers are controlled to transparent mode, and a sequence of patterned light patterns is projected by projector 100 directly onto object 11, through the transparent EGlass layers (step S511). Step S512 captures images of the object as illuminated by the light patterns, and step S513 estimates 3D surface shape of the object by using the captured images.

Figure 2D:
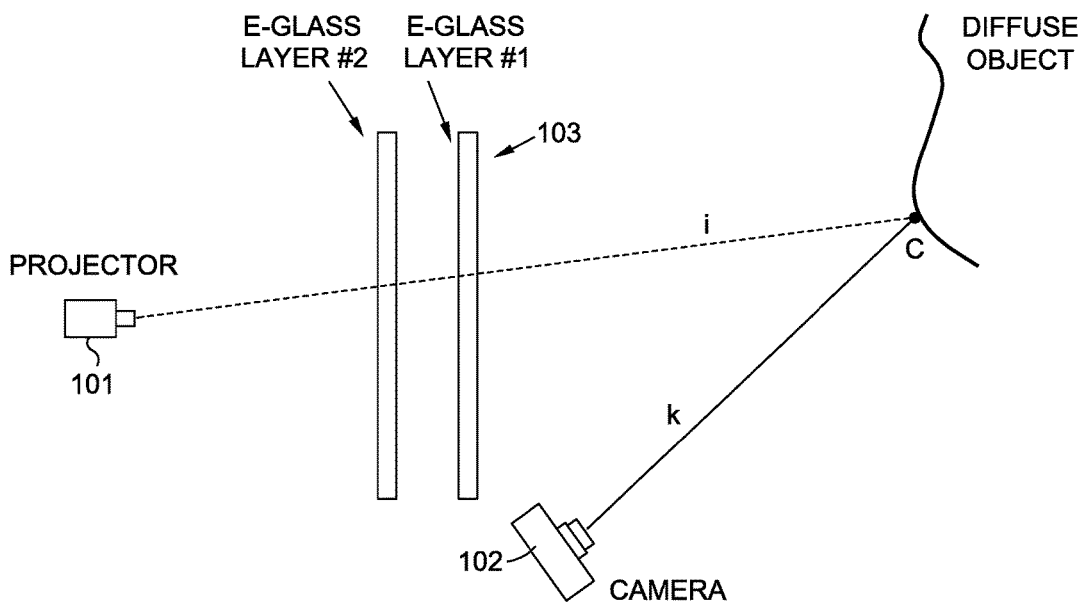

Referring to FIG. 2D, based on triangulation method using equations 1 to 6 and projector 101, camera 102 and Eglass layers 103, one can estimate position of point C on a diffuse object. The ray "i" is defined based on intrinsic parameters of projector 101.

Flow then returns to step S508, for repositioning of the object as described above, or for replication of the object at step S509, as also described above.

Figure 6A:
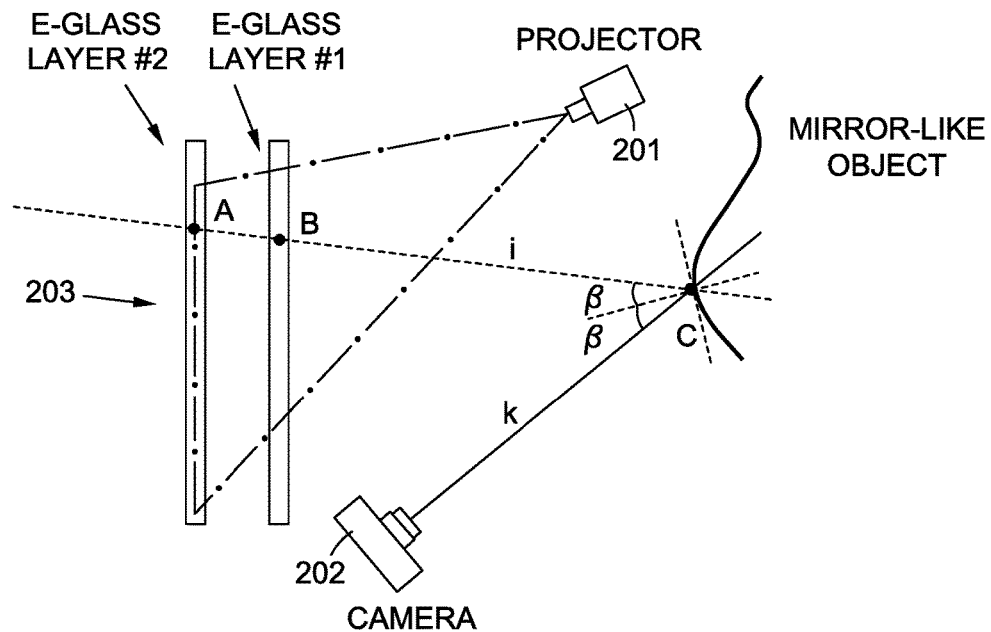
FIGS. 6A, 6B and 6C are views showing second, third and fourth example embodiments.

FIG. 6A is a view depicting a second embodiment. In one difference between the first and second embodiments, whereas in the first embodiment the multiple EGlass layers 103 are positioned such that they are between projector 101 and the inspection station 12, in this second embodiment the multiple EGlass layers 203 are positioned such that they are not between projector 201 and the inspection station. In both embodiments, the projector is positioned to project patterned light towards the multiple EGlass layers.

The embodiment of FIG. 6A operates mainly in accordance with steps S501 through S509 of FIG. 5A. However, because projector 201 is positioned so as to be able to project patterns through the multiple EGlass layers to the object, the embodiment of FIG. 6A is not able to estimate 3D surface shape of diffuse objects, at least not without a physical reconfiguration such that projector 201 is repositioned so as to project patterns toward the object, rather than toward the EGlass layers.

Figure 6B:
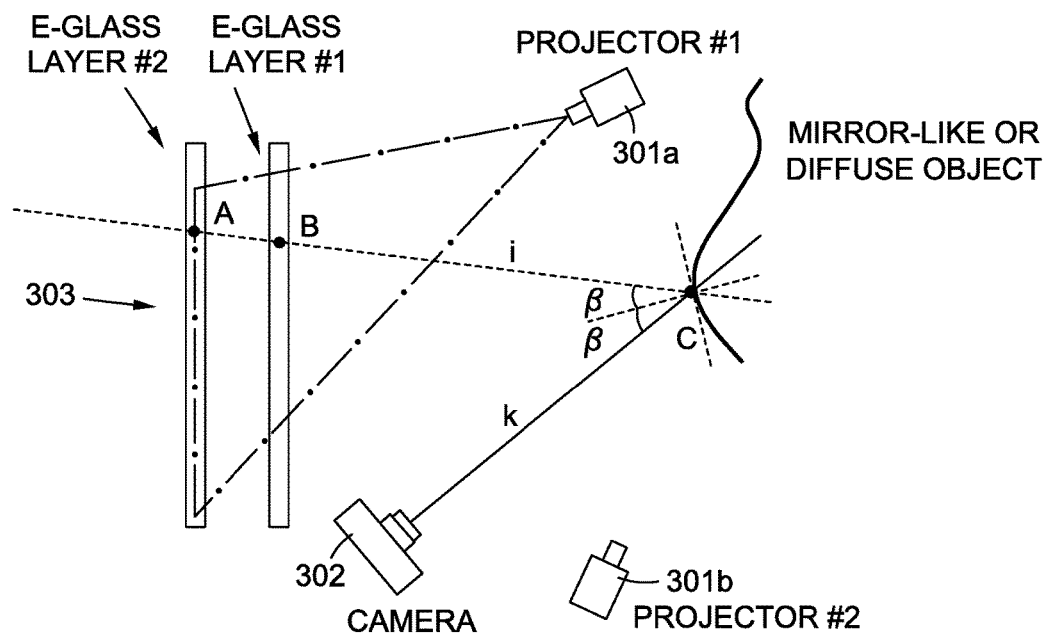

FIG. 6B is a view depicting a third embodiment. In one difference between the third embodiment and the second embodiment, the third embodiment includes a second projector 301b which projects patterns toward the inspection station. Because of the provision of a second projector, the third embodiment of FIG. 6B is able to estimate 3D surface shape of mirror-like objects using patterns projected from first projector 301a, and is able to estimate 3D surface shape of diffuse objects using projection of patterns from second projector 301b. Thus, the third embodiment shares an advantageous effect of the first embodiment, in that 3D surface shape of both mirror-like objects and diffuse objects can be estimated without a change in physical configuration.

Figure 6C:
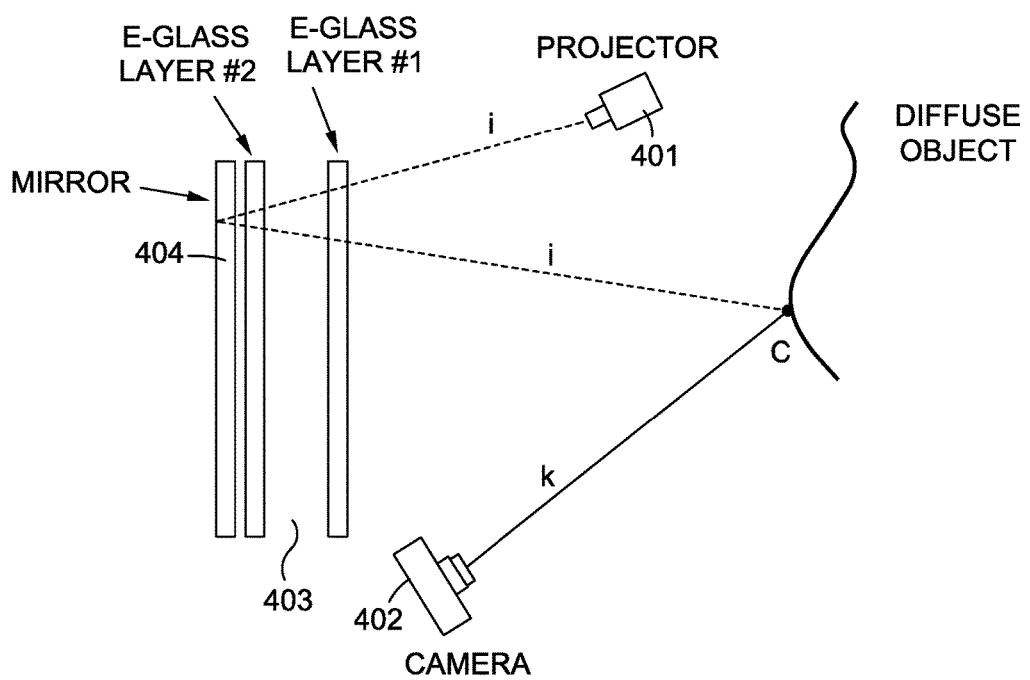

FIG. 6C is a view depicting a fourth embodiment to help address the limitation noted above, that is, that the embodiment of FIG. 6A is not able to estimate 3D surface shape of diffuse objects, at least not without a physical reconfiguration such that the projector is repositioned so as to project patterns toward the object, rather than toward the EGlass layers.

In particular, FIG. 6C depicts and embodiment which adds a mirror 404 to the arrangement of projector 401, camera 402, multiple EGlass layers 403. By adding mirror 404 and setting both EGlass layers 403 to transparent mode, one can project directly on a diffuse object and use the same physical configuration for both specular and diffuse objects.

Computer Implementation

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a CPU typically includes software resident on a storage media (e.g., a disk drive or memory card), which, when executed, directs the CPU in performing transmission and reception functions. The CPU software may run on an operating system stored on the storage media, such as, for example, UNIX or Windows (e.g., NT, XP, and Vista), Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

What is claimed is:

1. An apparatus for depth estimation of a surface of an object positioned at an inspection station, the apparatus comprising:
   first and second transparency-controllable layers, the first and second layers being positioned in spaced-apart relation relative to each other, wherein both of the first and second layers are controllably switchable between a transparent mode in which the layer is transparent, and a diffuse mode in which the layer diffuses light;
   a projector positioned and configured to project patterned light toward the first and second layers so as to illuminate the inspection station with patterned light;
   an image capture device positioned and configured to capture images of the object at the inspection station; and
   a controller configured to control transparency of the first and second layers and to control projection of patterned light by the projector, and configured to estimate depth of the surface of the object positioned at the inspection station by calculations using images of the object captured by the image capture device.

2. The apparatus according to claim 1, wherein the first and second layers are positioned between the projector and the inspection station, and wherein the projector is positioned to project patterned light toward the inspection station.

3. The apparatus according to claim 2, wherein the controller controls both of the first and second layers to the transparent mode, and controls the projector to project patterned light onto the object, and
   wherein based on diffuse components of the captured images, the controller estimates depth of the surface of the object having at least some diffuse characteristics.

4. The apparatus according to claim 3, wherein the patterned light comprises a sequence of patterns, different from each other, such that each pixel at each layer is uniquely identifiable.

5. The apparatus according to claim 4, wherein the controller determines depth at multiple points on the surface of the object by decoding patterns in the captured images.

6. The apparatus according to claim 5, wherein the patterned light comprises a sequence of binary patterns of horizontal and vertical stripe patterns, each pattern in the sequence having a spatial frequency that differs from others of the patterns in the sequence.

7. The apparatus according to claim 6, wherein the patterns are formed using binary Gray codes.

8. The apparatus according to claim 3, further comprising three or more transparency-controllable layers, wherein all of the layers are controlled to the transparent mode.

9. The apparatus according to claim 3, wherein a mirror is arranged behind both of the first and second layers, and wherein the projector projects directly onto the object having at least some diffuse characteristics.

10. The apparatus according to claim 1, wherein the first and second layers are positioned such that they are not between the projector and the inspection station, and wherein the projector is positioned to project patterned light toward the first and second layers.

11. The apparatus according to claim 1, wherein in a first phase the controller controls the first layer to the diffuse mode and the second layer to the transparent mode, and controls the projector to project a first sequence of patterned light onto the first layer, wherein in a second phase the controller controls the first layer to the transparent mode and the second layer to the diffuse mode, and controls the projector to project a second sequence of patterned light onto the second layer, and wherein based on specular components of the captured images, the controller estimates depth of the surface of an object having at least some specular characteristics.

12. The apparatus according to claim 11, wherein the patterned light comprises a sequence of patterns, different from each other, such that each pixel at each layer is uniquely identifiable.

13. The apparatus according to claim 12, wherein the controller determines depth at multiple points on the surface of the object by decoding patterns in the captured images of deformed patterns reflected by the surface of the object from the first and second layers.

14. The apparatus according to claim 13, wherein each of the first and second sequences of patterned light comprises a sequence of binary patterns of horizontal and vertical stripe patterns, each pattern in the sequence having a spatial frequency that differs from others of the patterns in the sequence.

15. The apparatus according to claim 14, wherein the first and second sequence of patterns are formed using binary Gray codes.

16. The apparatus according to claim 13, wherein the spaced-apart relation of the first and second layers is determined by calibration, and wherein the controller determines depth at multiple points on the surface of the object by tracing paths of light rays from the first layer and the second layer using the calibration.

17. The apparatus according to claim 11, further comprising three or more transparency-controllable layers, wherein each of the layers in turn is controlled to the diffuse mode while all other layers are controlled to the transparent mode.

18. The apparatus according to claim 1, wherein each of the first and second layers is comprised of a polymer dispersed liquid crystal (PDLC) or polymer stabilized cholesteric texture (PSCT) film sandwiched between two layers of glass with two layers of conductive interlayers, so as to allow control of the layer between the transparent mode and the diffuse mode.

19. A method for estimating depth of a surface of an object having at least some specular characteristics, the method comprising:

controlling first and second transparency-controllable layers between a transparent mode in which the layer is transparent and a diffuse mode in which the layer diffuses light, wherein the first and second layers are positioned in spaced-apart relation relative to each other;

projecting a first sequence of light patterns onto the first layer while the first layer is in the diffuse mode and the second layer is in the transparent mode, wherein the first and second layers are positioned to illuminate the object with the light patterns projected thereon;

projecting a second sequence of light patterns onto the second layer while the first layer is in the transparent mode and the second layer is in the diffuse mode;

capturing images of deformed patterns reflected from the first and second layers by the surface of the object corresponding to illumination of the object by the layers onto which the first and second sequence of light patterns are projected; and estimating depth of the surface of the object by calculations using the captured images.

20. The method according to claim 19, further comprising:

controlling both of the first and second layers to the transparent mode;

projecting patterned light onto the surface of the object and capturing images of the object illuminated by the projections; and estimating depth of the surface of the object by calculations using a diffuse component of the captured images.

21. The method according to claim 20, wherein there are three or more transparency-controllable layers, and wherein all of the layers are controlled to the transparent mode.

22. The method according to claim 19, wherein the patterned light comprises a sequence of patterns, different from each other, such that each pixel at each layer is uniquely identifiable.

23. The method according to claim 22, wherein the spaced-apart relation of the first and second layers is determined by calibration, and wherein estimating depth additionally comprises a determination of depth at multiple points on the surface of the object by tracing paths of light rays from the first layer and the second layer using the calibration.

24. The method according to claim 23, wherein the patterned light comprises a sequence of binary patterns of horizontal and vertical stripe patterns, each pattern in the sequence having a spatial frequency that differs from others of the patterns in the sequence, and wherein estimating depth comprises a determination of depth at multiple points on the surface of the object by decoding the binary patterns in a specular component of the captured images.

25. The method according to claim 19, wherein there are three or more transparency-controllable layers, and wherein each of the layers in turn is controlled to the diffuse mode while all other layers are controlled to the transparent mode.

\* \* \* \* \*